United States Patent
Ahn et al.

(10) Patent No.: US 7,860,452 B2
(45) Date of Patent: Dec. 28, 2010

(54) METHOD OF ASSIGNING CARRIER FOR MITIGATING INTER-CELL INTERFERENCE IN FIXED RELAY BASED COMMUNICATION SYSTEM

(75) Inventors: Chang Wook Ahn, Gwangju (KR); Young-Doo Kim, Suwon-si (KR); Eung Sun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 682 days.

(21) Appl. No.: 11/777,649

(22) Filed: Jul. 13, 2007

(65) Prior Publication Data

US 2008/0194267 A1    Aug. 14, 2008

(30) Foreign Application Priority Data

Feb. 13, 2007    (KR) ...................... 10-2007-0014928

(51) Int. Cl.
H04B 7/15    (2006.01)
(52) U.S. Cl. .................... 455/11.1; 455/422.1
(58) Field of Classification Search .............. 455/452.2, 455/7, 11.1, 13.1, 15
See application file for complete search history.

(56) References Cited

U.S. PATENT DOCUMENTS 6,400,697 B1    6/2002    Leung et al.
2005/0096062 A1    5/2005    Ji et al.
2005/0271012 A1    12/2005    Agrawal et al.
2006/0209721 A1    9/2006    Mese et al.
2006/0252367 A1 *    11/2006    Haartsen .................... 455/11.1

FOREIGN PATENT DOCUMENTS

| EP | 0924897 A3 | 10/2003 |
| EP | 1594331 A1 | 4/2005 |
| KR | 1020020004841 A | 1/2002 |
| KR | 10-2005-0039453 A | 4/2005 |
| KR | 10-2006-0041100 A1 | 11/2006 |
| WO | 2005/041348 A2 | 5/2005 |
| WO | 2006-034578 A1 | 4/2006 |

* cited by examiner

Primary Examiner—Tu X Nguyen
(74) Attorney, Agent, or Firm—Sughrue Mion, PLLC (57) ABSTRACT

A method of assigning a carrier for mitigating inter-cell interference in a fixed relay based communication system is provided. In a normal mode, the method includes defining at least one sector group by grouping cells at least two tiers away from each other; selecting a single sector group; and assigning, by a base station of the selected sector group, a first carrier to a relay station or a mobile station which is located in a coverage area of the base station. In a relay mode, the method includes determining whether a current mode is a normal mode or a relay mode; determining whether a base station is included in a selected sector group; and assigning carriers to a relay station or a mobile station belonging to the base station, when the current mode is the normal mode and the base station is included in the selected sector group.

18 Claims, 9 Drawing Sheets

METHOD OF ASSIGNING CARRIER FOR MITIGATING INTER-CELL INTERFERENCE IN FIXED RELAY BASED COMMUNICATION SYSTEM

CROSS-REFERENCE TO RELATED APPLICATION

This application claims priority from Korean Patent Application No. 10-2007-0014928, filed on Feb. 13, 2007, in the Korean Intellectual Property Office, the entire disclosure of which is incorporated herein by reference.

BACKGROUND OF THE INVENTION

1. Field of the Invention

Methods and apparatuses consistent with the present invention relate to a fixed relay based communication system and, more particularly, to assigning a carrier for mitigating an inter-cell interference in a fixed relay based communication system.

2. Description of Related Art

In communication systems, related art systems which increase coverage by locating relay stations between base stations and mobile stations have been proposed. Due to the use of relay stations, mobile stations which are not covered by base stations may be provided with wireless services. In related art relay based communication systems, base stations transmit data to relay stations in normal mode, and the relay stations transmit the data to mobile stations in relay mode. Such normal mode and relay mode may be divided into a time axis or a frequency axis. However, the use of relay stations increases interference since more signals are simultaneously transmitted. Particularly, inter-cell interference greatly affects system performance in related art orthogonal frequency division multiplexing (OFDM) based cellular systems.

SUMMARY OF THE INVENTION

An aspect of the present invention provides a method of assigning a carrier for mitigating inter-cell interference which actively adjusts to a communication environment change in a fixed relay structure and distributedly reduces an inter-cell interference.

An aspect of the present invention also provides a method of assigning a carrier for mitigating inter-cell interference where information of all nodes included in an entire communication system is not collected. Each node distributedly performs the method of assigning a carrier according to an exemplary embodiment of the present invention, and thus a carrier for mitigating inter-cell interference may be assigned.

An aspect of the present invention also provides a method of assigning a carrier for mitigating inter-cell interference which is independently performed for each sector and may solve an imbalance of an inter-sector or inter-cell service load.

An aspect of the present invention also provides a method of assigning a carrier for mitigating inter-cell interference which may adjust for a breakdown or malfunction of a relay station.

According to an aspect of the present invention, there is provided a method of assigning a carrier in a normal mode of a relay communication system, the method including defining at least one sector group by grouping cells which are at least two tiers away from each other; selecting a sector group from the at least one sector group; and assigning, by a base station of the selected sector group, a first carrier to a relay station and a mobile station which belong to the base station.

The assigning may include broadcasting, by the base station of the selected sector group, a signal tone on every carrier; broadcasting the signal tone on a carrier assigned to a remaining base station by the remaining base station belonging to the selected sector group and excluding the base station; receiving a measured signal-to-interference-and-noise ratio (SINR) from the relay station and the mobile station belonging to the base station; and assigning the first carrier to the relay station and the mobile station based on the SINR.

According to another aspect of the present invention, there is provided a method of assigning a carrier in a relay mode of a relay communication system, the method including selecting a node from at least one base station and at least one relay station included in a cell; broadcasting, by the selected node, a signal tone on every carrier; broadcasting the signal tone on a carrier assigned to a remaining node by the remaining node which is a base station or a relay station belonging to the cell and excluding the selected node; measuring a SINR by a mobile station belonging to the selected node of the cell; reporting the measured SINR to the selected node from the mobile station; and assigning, by the selected node where the mobile station belongs, the carrier to the mobile station based on the SINR.

According to still another aspect of the present invention, there is provided a method of assigning a carrier in a base station in a relay communication system, the method including determining whether a current mode is a normal mode or a relay mode; determining whether the base station is included in a selected sector group; assigning a plurality of carriers to be used in the normal mode to a relay station and a mobile station belonging to the base station, when the current mode is the normal mode and the base station is included in the selected sector group; and broadcasting a signal tone on a carrier assigned to the base station, when the current mode is the normal mode and the base station is excluded from the selected sector group.

According to yet another aspect of the present invention, there is provided a method of assigning a carrier by a relay station in a relay communication system, the method including determining whether a current mode is a normal mode or a relay mode; determining whether the relay station is a selected node when the current mode is the relay mode; assigning a carrier to be used in the relay mode to a first mobile station belonging to the relay station, when the current mode is the relay mode and the relay station is the selected node; and broadcasting a signal tone on a carrier assigned to the relay station, when the current mode is the relay mode and the relay station is excluded from the selected node.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1A:
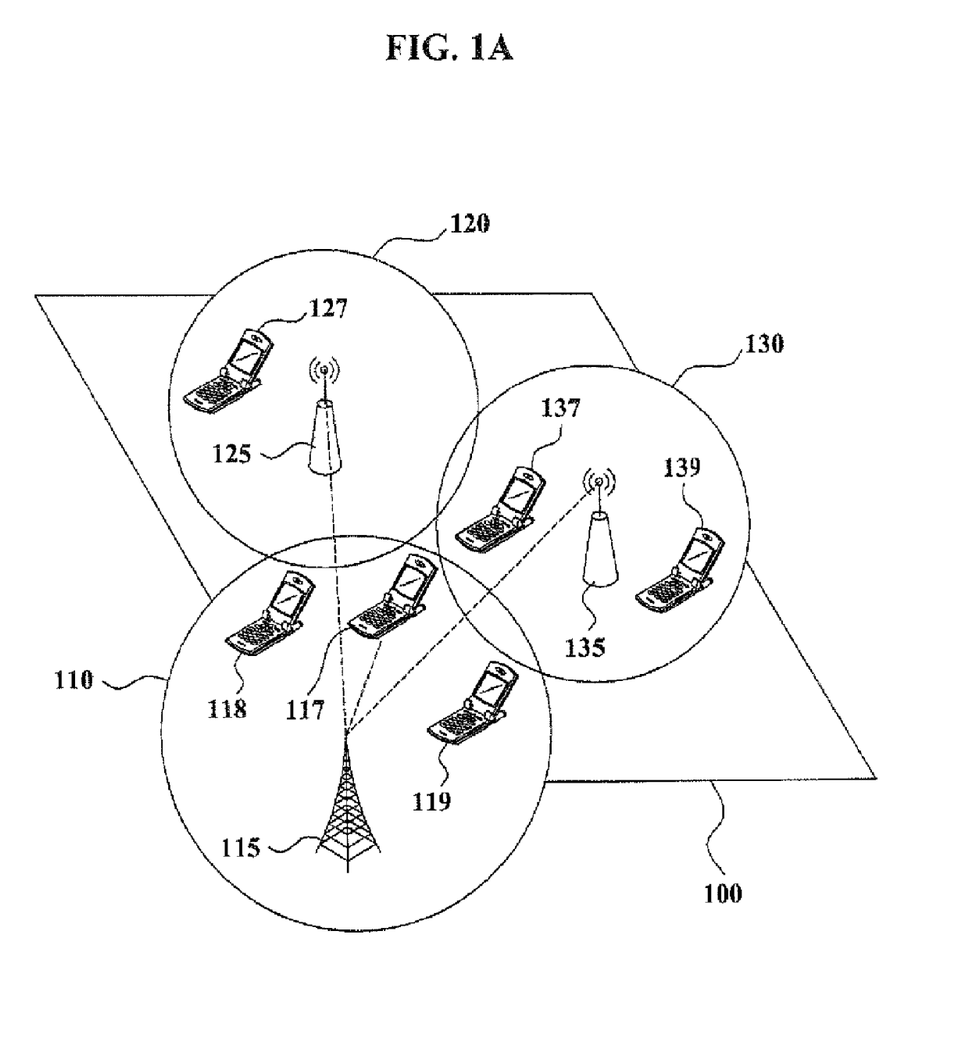
FIGS. 1A and 1B are diagrams illustrating a normal mode and a relay mode, respectively, according to an exemplary embodiment of the present invention.
Figure 1B:
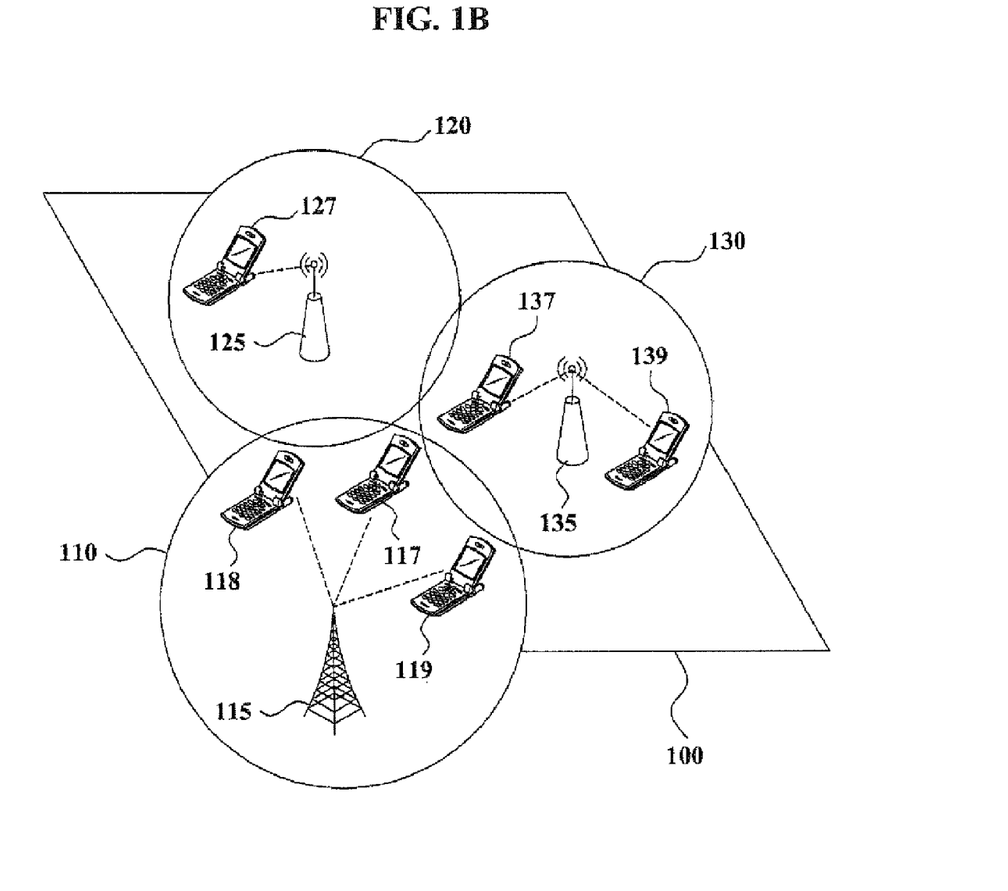

FIGS. 1A and 1B are diagrams illustrating a normal mode and a relay mode, respectively, according to an exemplary embodiment of the present invention. For convenience of explanation, FIGS. 1A and 1B illustrate an operation in a single sector.

FIG. 1A illustrates a base station 115, relay stations 125 and 135, and mobile stations 117, 118, 119, 127, 137, and 139, which are included in a single sector 100 in a normal mode. A normal mode is a mode where a communication is performed (1) between a base station and a mobile station and (2) between a base station and a relay station. In the normal mode, communication between a relay station and a mobile station is not performed. As illustrated in FIG. 1A, the base station 115 cannot directly communicate with the mobile stations 127, 137, and 139 included in the sector 100 because the mobile stations 127, 137, and 139 are too distant from the base station 115 only to fail directly receiving signals from the base station 115. To overcome this coverage problem, the relay stations 125 and 135 are used between the base station 115 and the mobile stations 127, 137, and 139. By using the relay stations 125 and 135, the base station 115 can communicate with the mobile stations 127, 137, and 139. Referring to FIG. 1A, in the normal mode, the base station 115 communicates with the mobile station 117 and the relay stations 125 and 135 included in the sector 100. In the normal mode, the relay stations 125 and 135 communicate with the base station 115. However, in the normal mode, and the relay stations 125 and 135 do not communicate with the mobile stations 117, 118, 119, 127, 137, and 139.

FIG. 1B illustrates an operation in the relay mode. A relay mode is a mode where a communication is performed (1) between a mobile station and a base station and (2) between a mobile station and a relay station. In the relay mode, a communication is not performed between a base station and a relay station. In the relay mode, the relay station 125 communicates with the mobile station 127 which is located within a coverage area 120 of the relay station 125. Also, the relay station 135 communicates with the mobile stations 137 and 139 located within a coverage area 130 of the relay station 135. The base station 115 may communicate with the mobile station 117, which is a portion of the mobile stations 117, 118, and 119 located within a coverage area 110 of the base station 115. In the relay mode, the base station 115 does not communicate with the relay stations 125 and 135. In this instance, the communication between the base station 115 and the mobile station 117, and the communication between the relay stations 125 and 135 and the mobile stations 127, 137, and 139 are simultaneously performed in the sector 100. Accordingly, it is desirable to assign a carrier used for the communications described above to reduce an inter-cell interference.

Figure 2:
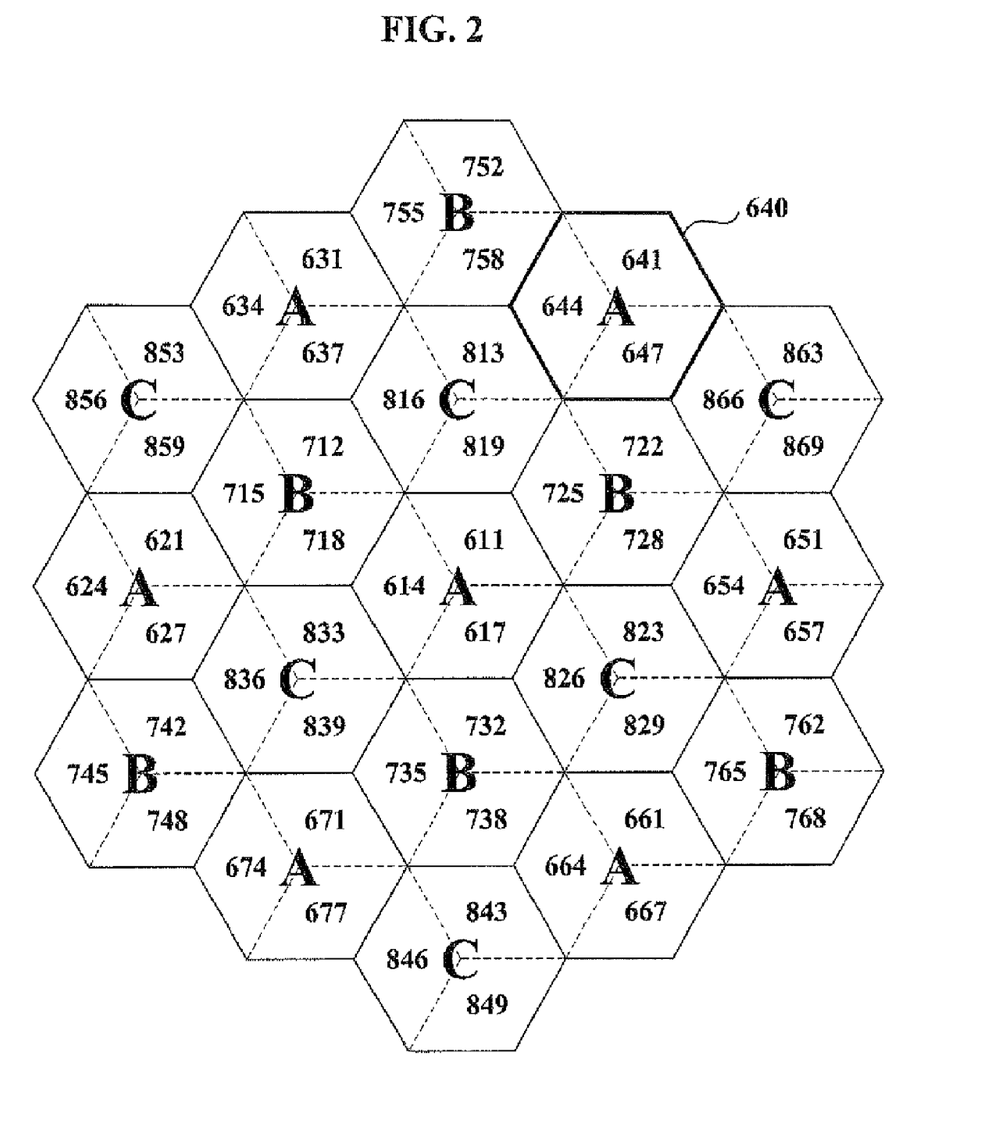
FIG. 2 is a diagram illustrating a cell, a sector, and a sector group according to an exemplary embodiment of the present invention.

FIG. 2 is a diagram illustrating a cell, a sector, and a sector group according to an exemplary embodiment of the present invention.

According to an exemplary embodiment of the present invention, an area is divided into a plurality of cells. The plurality of cells are grouped. For example, in FIG. 2, cells (represented by hexagons in the figure) having a same letter, for example, A, B, or C, are included in a same group. In the present invention, cells included in the same group are selected to be at least two tiers away from each other. Accordingly, a carrier may be assigned more efficiently.

A single cell includes a plurality of sectors. Although a single cell includes three sectors in an exemplary embodiment of the present invention illustrated in FIG. 2, the present invention is not limited a single cell having only three sectors, as shown in FIG. 2. In the present invention, a cell may comprise N number of sectors, N being greater than 1. For example, in FIG. 2, a cell 640 includes sectors 641, 644, and 647.

Also, sectors from a plurality of cells in a group may be grouped together to form a sector group. For example, in FIG. 2, sectors 614, 624, 634, 644, 654, 664, and 674 of sectors of the cells included in a cell group A, may be included in a same sector group. Alternatively, sectors 611, 621, 631, 641, 651, 661, and 671 may be included in a same sector group. Also, sectors 617, 627, 637, 647, 657, 667, and 677 may be included in a same sector group. In other words, three different sector groups may be formed, for example a sector group including sectors 614, 624, 634, 644, 654, 664, and 674; a sector group including sectors 611, 621, 631, 641, 651, 661, and 671; and a sector group including sectors 617, 627, 637, 647, 657, 667, and 677. In an exemplary embodiment of the present invention, a single sector group is comprised by individually selecting a sector included in a same group and grouping. Also, sectors included in the single sector group, are included in a cell which is at least two tiers away. Similarly, sectors 712, 722, 732, 742, 752, and 762; sectors 710, 730, 750, 760, 780, and 765; and sectors 718, 728, 738, 748, 758, and 768 of sectors included in a cell group B, are included in different sector groups, respectively. Also, sectors 813, 823, 833, 843, 853, and 863, sectors 816, 826, 836, 846, 856, and 866, and sectors 819, 829, 839, 849, 859, and 869 of sectors included in a cell group C, are included in different sector groups, respectively.

Figure 3:
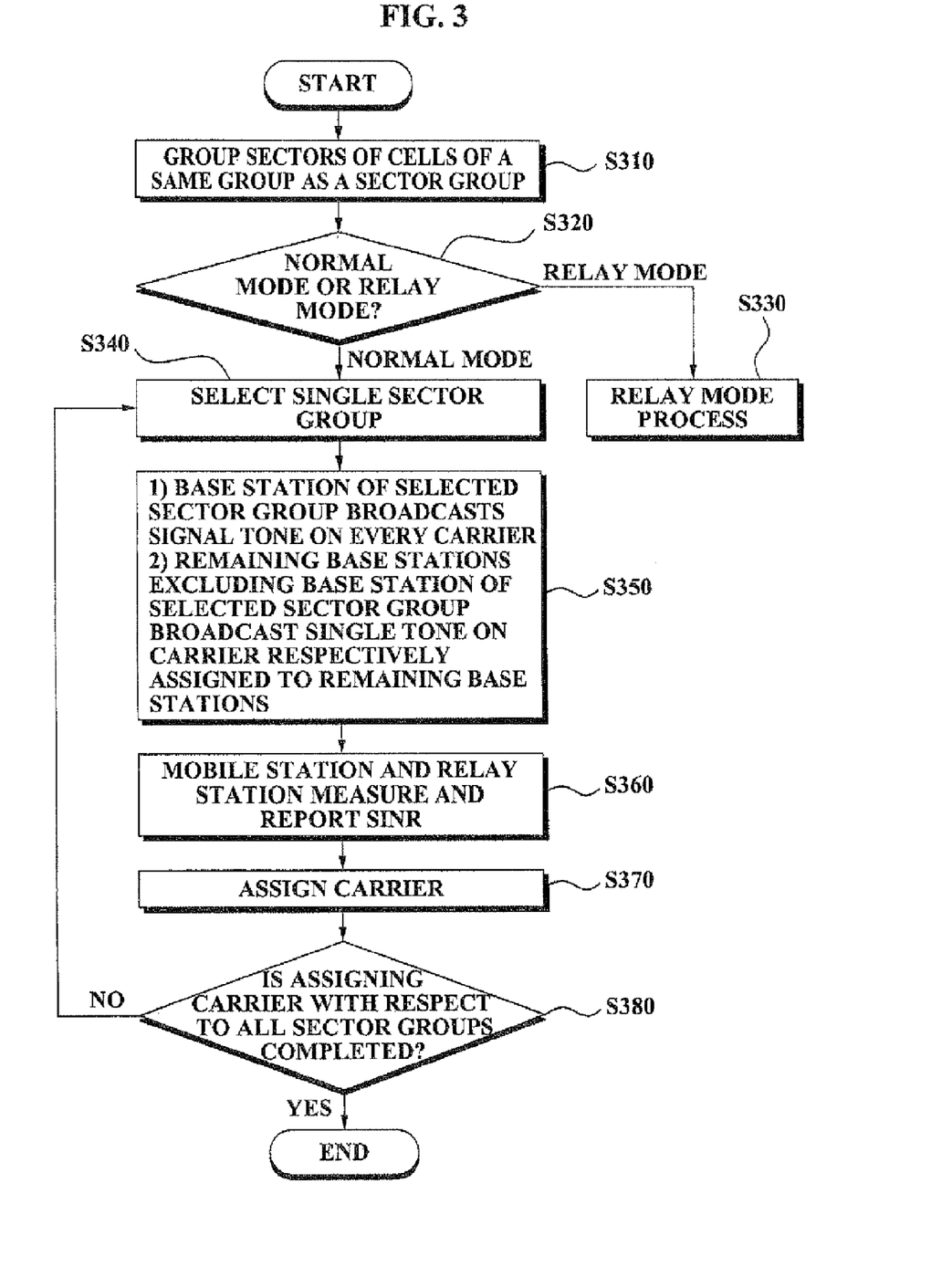
FIG. 3 is a flowchart illustrating a method of assigning a carrier in a normal mode according to an exemplary embodiment of the present invention.
Figure 5:
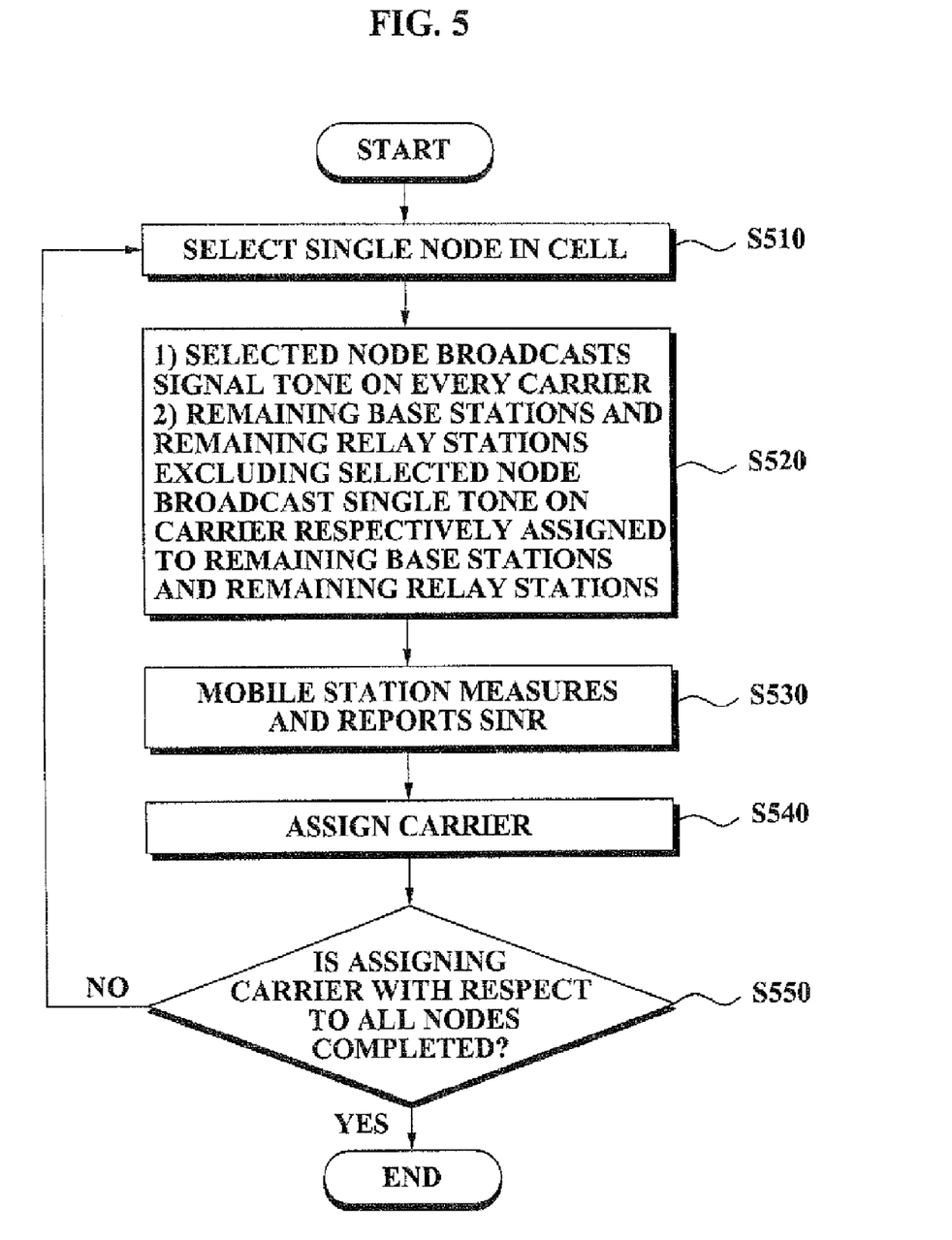
FIG. 5 is a flowchart illustrating a method of assigning a carrier in a relay mode according to an exemplary embodiment of the present invention.

In the present invention, although a base station, a mobile station, and a relay station perform a general communication operation, the base station, the mobile station, and the relay station assign a carrier in a normal mode periodically or according to a condition or command as illustrated in FIG. 3. The condition may be predetermined. Also, in a relay mode, the base station, the mobile station, and the relay station assign a carrier, as illustrated in FIG. 5, which is described in more detail below.

In the normal mode, a base station covering a relay station and a mobile station assigns at least one carrier to the relay station and the mobile station, based on a signal-to-interference-and-noise ratio (SINR). The SINR is measured in the relay station and the mobile station with respect to the at least one carrier. Specifically, the base station assigns carriers to be used in the normal mode to the relay station and the mobile station. Accordingly, since the carriers to be used between the base station and the relay station and between the base station and the mobile station are assigned in the normal mode, the carriers used by the base station in the normal mode are assigned. Thus, although the base station does not receive any information from another base station, the base station may assign the carriers with little inter-cell interference to the base station.

In the relay mode, a relay station assigns a carrier to a mobile station belonging to the relay station, based on a SINR measured in the mobile station belonging to the relay station. Also, in the relay mode, since the base station may communicate with the mobile station, the base station assigns the carrier to the mobile station which performs a communication in the relay mode. Specifically, the base station assigns the carrier to be used in the relay mode to a mobile station which directly communicates with the base station, and the relay station assigns the carrier to be used in the relay mode to the mobile station belonging to the relay station.

FIG. 3 is a flowchart illustrating a method of assigning a carrier in a normal mode according to an exemplary embodiment of the present invention.

In operation S310, at least one sector group is defined by grouping sectors of cells which are at least two tiers away from each other (i.e., are cells of a same group) as a sector group. The at least one sector group has been described in detail with reference to FIG. 2 above.

In operation S320, a node determines whether a current mode is a normal mode or a relay mode. The node may be a base station, a relay station, or a mobile station. Nodes corresponding to the base station, the relay station, or the mobile station perform an operation according to the current mode. The operation may be predetermined.

As a result of the determining in operation S320, if it is determined that the current mode is the relay mode, a relay mode process is performed in operation S330, which is described in detail with reference to FIG. 5 below.

As the result of the determining in operation S320, if it is determined that the current mode is the normal mode, a single sector group is selected from the at least one sector group in operation S340. For example, in FIG. 2, a sector group including sectors 614, 624, 634, 644, 654, 664, and 674 may be selected. The node determines whether the node is included in the selected sector group. The node may be the base station.

When the current mode is the normal mode, a base station of the selected sector group assigns carriers to be used in the normal mode to a relay station or a mobile station, which is performed in operations S350, S360, and S370. In this instance, the relay station or the mobile station belongs to the base station, i.e., is in a coverage area of the base station.

In operation S350, a preprocessing phase is performed.

All the base stations in the sector group selected in operation S340 broadcast a signal tone on every carrier. For example, when the selected sector group includes the sectors 614, 624, 634, 644, 654, 664, and 674, all base stations included in the sectors 614, 624, 634, 644, 654, 664, and 674 broadcast the signal tone on every carrier.

Also, remaining base stations excluding all the base stations of the selected sector group (i.e. base stations in sector groups which are not selected) broadcast a signal tone on a carrier assigned to each respective remaining base station. For example, when the selected sector group includes the sectors 614, 624, 634, 644, 654, 664, and 674, base stations which are not included in the sectors 614, 624, 634, 644, 654, 664, and 674 broadcast the signal tone on a carrier which is previously assigned to themselves.

In operation S360, the relay station and the mobile station, which receive the signal tone and are included in the selected sector group, measure a SINR. Also, in operation S360, the relay station and the mobile station report the measured SINR to the base station to which the relay station and the mobile station belong. The base station of the selected sector group receives the measured SINR from the relay station and the mobile station belonging to the base station. For example, in FIG. 1A, when the sector 100 is a sector of the selected sector group, the base station 115 receives the SINR report from the relay stations 125 and 135 and the mobile stations 117, 118 and 119.

In operation S370, the base station assigns a most appropriate carrier with respect to each of the relay station and the mobile station belonging to the base station. Based on the received SINR report in operation 360, base stations of the selected sector group may differentiate a carrier having a least interference with a carrier which is used by base stations of another sector, i.e., the carrier which is assigned to the base stations of the other sector, with respect to each of the relay station and the mobile station belonging to the base stations. Accordingly, each of the base stations assigns a carrier having a least SINR with respect to each of the relay station and the mobile station belonging to the base station. In FIG. 1A, when the sector 100 is a sector of the selected sector group, the base station 115 assigns at least one carrier to each of the relay stations 125 and 135 and mobile stations 117, 118 and 119. In this instance, carriers different from those carriers, which were previously used by each of the relay stations 125 and 135 and mobile stations 117, 118 and 119, may be assigned to each of the relay stations 125 and 135 and mobile stations 117, 118 and 119. Also, since a carrier set which is assigned by the base station 115 with respect to each of the relay stations 125 and 135 and mobile stations 117, 118 and 119 is a carrier set which is used by the base station 115, the carrier set is the carrier set which is assigned to the base station 115. Accordingly, the base station 115 independently assigns the carrier.

Also, in the normal mode, an allocation of a carrier resource may use a sector skewness resolution algorithm and an adaptive resource allocation algorithm, which is described in detail with reference to FIGS. 6, 7A, and 7B below.

Thus, according to an exemplary embodiment of the present invention, the assigning of the carrier in the normal mode with respect to the base stations included in the single sector group is completed. For example, when the sector group including the sectors 614, 624, 634, 644, 654, 664, and 674 is selected in operation S340, the carriers used in the normal mode are assigned between the base stations and the relay stations belonging to the sectors 614, 624, 634, 644, 654, 664, and 674. Also, the carriers used in the normal mode are assigned between the base stations and the mobile stations belonging to the sectors 614, 624, 634, 644, 654, 664, and 674.

In operation S380, whether the assigning of the carrier with respect to all sector groups is completed is determined. If it is determined that the assigning of the carrier with respect to the all sector groups is completed, the assigning of the carrier in the normal mode ends. After the assigning of the carrier ends in the normal mode, an assigning of a carrier in the relay mode may be performed by returning to operation S330. If it is determined in operation S380 that the assigning of the carrier with respect to the all sector groups is not completed, the assigning of the carrier with respect to another sector group of the at least one sector group is performed, i.e., the process returns to operation S340. Accordingly, carriers to be used in the normal mode are newly assigned with respect to the base stations of the all sector groups.

Figure 4:
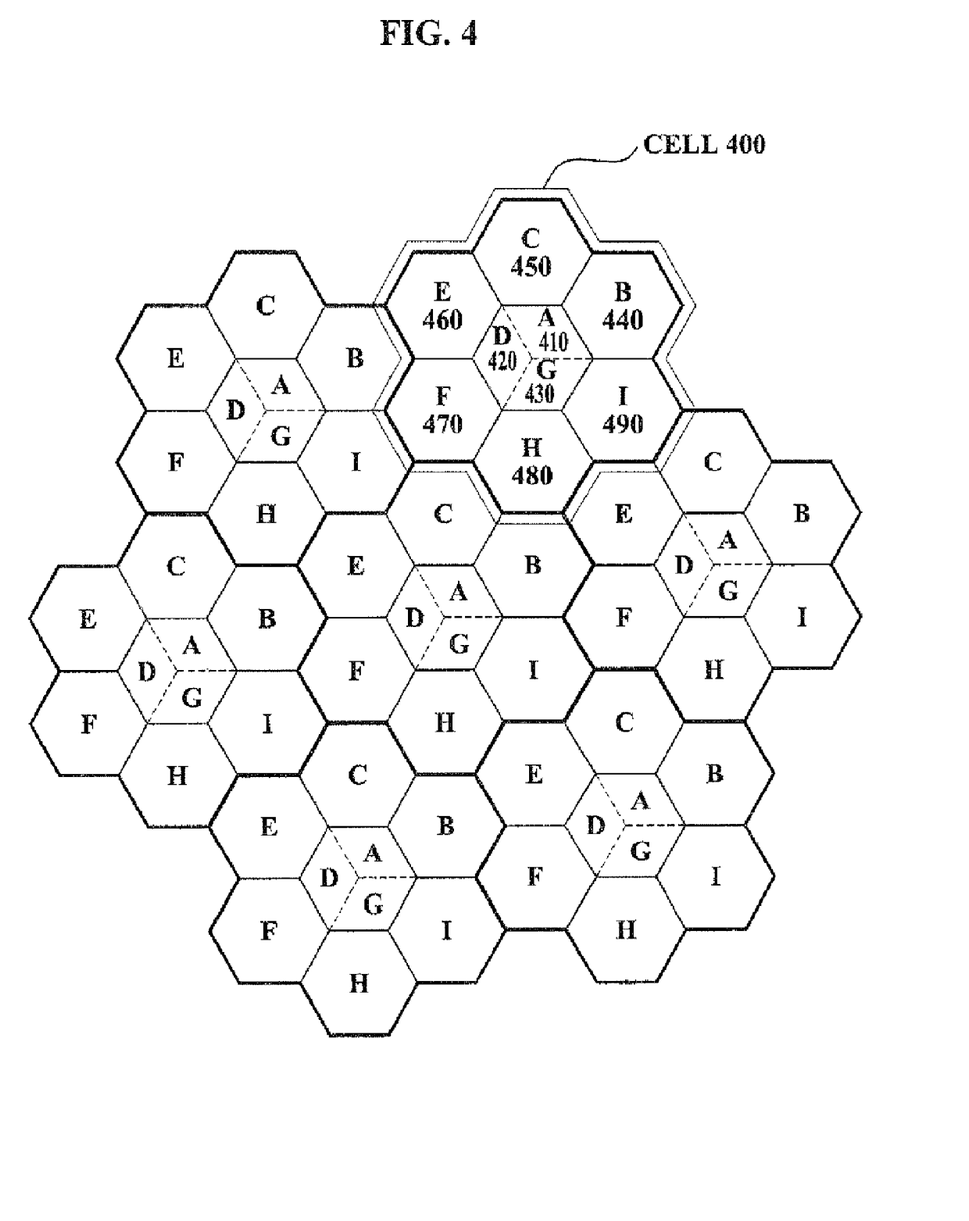
FIG. 4 is a diagram illustrating an example of a configuration of a cell to illustrate an assignment of a carrier in a relay mode according to an exemplary embodiment of the present invention.

FIG. 4 is a diagram illustrating an example of a configuration of a cell to illustrate an assignment of a carrier in a relay mode according to an exemplary embodiment of the present invention.

With reference to FIG. 4, a cell 400 includes 3 sectors, i.e., a sector A, a sector D, and a sector G. Each of the sector A, the sector D, and the sector G includes base stations 410, 420, and 430. For example, the base station 410 is installed in the sector A of the cell 400. Also, each relay station 440, 450, 460, 470, 480, and 490 is installed in each sub-cell B, C, E, F, H, I of the cell 400. The base station 410 transmits data to the relay stations 440 and 450 in a normal mode. Accordingly, the relay stations 440 and 450 transmit the data to a mobile station in the relay mode. Similarly, the base station 420 communicates with the relay stations 460 and 470, and the base station 430 communicates with the relay stations 480 and 490. Although three sectors are illustrated in FIG. 4, the present invention is not limited to three sectors included in a cell, or to two relay stations communicating with a single base station.

FIG. 5 is a flowchart illustrating a method of assigning a carrier in a relay mode according to an exemplary embodiment of the present invention. FIG. 5 represents the relay mode process at operation S330 from FIG. 3.

Turning first to FIG. 3, sectors of cells of a same group are grouped into at least one sector group in operation S310. A node determines whether a current mode is a normal mode or a relay mode in operation S320. The node may be a base station, a relay station, or a mobile station. Nodes of the base station, the relay station, or the mobile station perform an operation according to the current mode. The operation may be predetermined. As a result of the determining in operation S320, if it is determined that the current mode is the relay mode, a relay mode process illustrated in FIG. 5 is performed.

Turning to FIG. 5, in operation S510, a single node is selected from at least one base station and at least one relay station. The at least one base station and the at least one relay station are included in a single cell. For example, referring to FIG. 4, a node is selected from the base stations 410, 420, and 430 and the relay stations 440, 450, 460, 470, and 480 included in the cell 400. For example, the relay station 440 may be selected. The node determines whether the node is a selected node. The node may be the base station or the relay station.

As a result of the determining in operation S510, the selected node assigns a carrier to be used in the relay mode to a mobile station belonging to the selected node. For example, in FIG. 1B, when the relay station 135 is selected, the relay station 135 assigns a carrier to be used in the relay mode to the mobile stations 137 and 139 belonging to the relay station 135. In FIG. 1B, when the base station 115 is selected, the base station 115 assigns a carrier to be used in the relay mode to the mobile stations 118 and 119 belonging to the base station 115. The above-described operation is performed in operations S520, S530, and S540.

In operation S520, a preprocessing phase is performed.

In operation S520, the selected node, i.e., the base station or the relay station, broadcasts a signal tone on every carrier. For example, in FIG. 1B, when the selected node is the relay station 135, the relay station 135 broadcasts the signal tone on every carrier.

Also, remaining nodes, i.e., the base station or the relay station excluding the selected node in the cell broadcast a signal tone on a carrier assigned to the respective remaining node. For example, in FIG. 1B, when the selected node is the relay station 135, the base station 115 and the relay station 125 broadcast the signal tone on a carrier assigned to the base station 115 and the relay station 125, respectively.

In operation S530, a mobile station belonging to the selected node, i.e., the base station or the relay station, measures a SINR. Also, in operation S530, the mobile station reports the measured SINR to the selected node, i.e. the base station or the relay station, to which the mobile station belongs. For convenience of embodiment, all the mobile stations receiving the signal tone may be embodied to report the SINR to a node to which each of the mobile stations belongs. Then, the selected node receives the measured SINR from the mobile station belonging to the selected node. In FIG. 1B, when the selected node is the relay station 135, the relay station 135 receives the measured SINR from the mobile stations 137 and 139.

In operation S540, the selected node, i.e. the base station or the relay station, assigns a most appropriate carrier with respect to each mobile station belonging to the selected node. Based on the received SINR report received from each of the mobile stations belonging to the selected node in operation 530, the selected node may identify a carrier having a least interference with a carrier, which is used by other nodes included in a same cell, with respect to each mobile station belonging to the selected node. In this instance, the other nodes may be the base station or the relay station. Accordingly, the selected node assigns a carrier having a least SINR with respect to each mobile station belonging to the selected node. In FIG. 1B, when the selected node is the relay station 135, the relay station 135 assigns at least one carrier to each of the mobile stations 137 and 139, based on the SINR measured from the mobile stations 137 and 139. In this instance, a carrier different from a carrier, which is previously used by the mobile stations 137 and 139 in the relay mode, may be assigned. Also, since a carrier set which is assigned by the relay station 135, i.e., the selected node, with respect to each of the mobile stations 137 and 139 is a carrier set which is used by the selected node, the carrier set is the carrier set which is assigned to the selected node in the relay mode.

Also, in the relay mode, an allocation of a carrier resource may use a sector skewness resolution algorithm and an adaptive resource allocation algorithm, which is described in detail with reference to FIGS. 6, 7A, and 7B.

According to an exemplary embodiment of the present invention, the assigning of the carrier in the relay mode with respect to a single base station or relay station included in the single cell is completed. For example, when the relay station 450 of FIG. 4 is selected in operation S510, the assigning of a carrier used by the relay station 450 in the relay mode is completed in operations S520, S530, and S540.

In operation S550, whether the assigning of the carrier with respect to all nodes, i.e. the base station and the relay station, in the cell is completed is determined. If it is determined that the assigning of the carrier with respect to the all nodes is completed, the assigning of the carrier in the relay mode ends. If it is determined that the assigning of the carrier with respect to the all nodes is not completed, the assigning of the carrier with respect to another node, i.e., the base station and the relay station, is performed by returning to operation S510. The assigning of the carrier with respect to the other node is performed in operations S520, S530, and S540. Accordingly, the carrier to be used in the relay mode is newly assigned with respect to the nodes, i.e. the base station and the relay station, in the cell.

Figure 6:
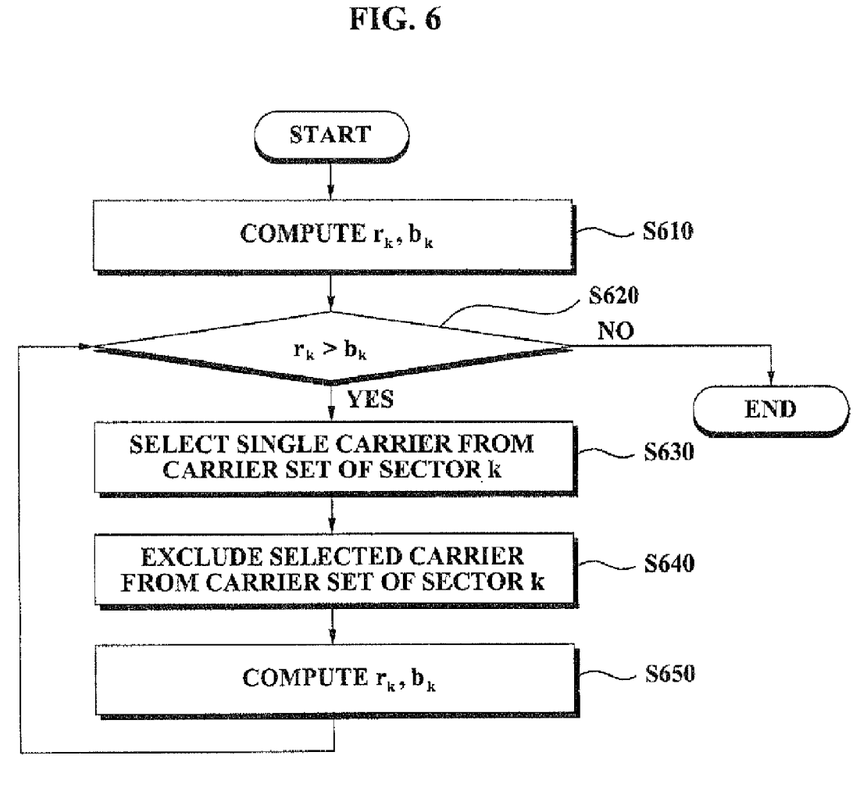
FIG. 6 is a flowchart illustrating a sector skewness resolution algorithm according to an exemplary embodiment of the present invention.

FIG. 6 is a flowchart illustrating a sector skewness resolution algorithm according to an exemplary embodiment of the present invention. The sector skewness resolution algorithm may be applied to a carrier assignment with respect to a base station in a normal mode, or to a carrier assignment with respect to a base station and a relay station in a relay mode.

Hereinafter, the carrier assignment with respect to the base station in the normal mode is described.

Prior to describing the sector skewness resolution algorithm, an average service rate $R_k$ of sector k, an average request rate $B_k$ of sector k, a proportional service rate $r_k$ of sector k, and a proportional request rate $b_k$ of sector k are described with reference to Equations 1-4 below.

$$R_k = \mu_k \cdot N_k \qquad \text{[Equation 1]}$$

Here, $\mu_k$ denotes an average service rate per carrier of sector k, and $N_k$ denotes a number of carriers of sector k. Equation 1 describes the average service rate $R_k$ of sector k. $R_k$ is obtained by multiplying the average service rate per carrier $\mu_k$ of sector k and the number of carriers $N_k$ of sector k.

$$B_k = \lambda_k \cdot M_k \qquad \text{[Equation 2]}$$

Here, $\lambda_k$ denotes an average request rate per node of sector k, and $M_k$ denotes a number of nodes of sector k. Equation 2 describes the average request rate $B_k$ of sector k. $B_k$ is obtained by multiplying the average request rate per node $\lambda_k$ of sector k and the number of nodes $M_k$ of sector k.

$$r_k = \frac{R_k}{\sum_{j=1}^{m} R_j} \qquad \text{[Equation 3]}$$

Here, m denotes a number of sectors for each cell. Equation 3 describes the proportional service rate $r_k$ of sector k. $r_k$ denotes the average service rate $R_k$ of sector k with respect to a sum of average service rates $R_j$ of all sectors of a cell including the sector k.

$$b_k = \frac{B_k}{\sum_{j=1}^{m} B_j} \qquad \text{[Equation 4]}$$

Here, m denotes a number of sectors for each cell. Equation 4 describes the proportional request rate $b_k$ of sector k. $b_k$ denotes the average request rate $B_k$ of sector k with respect to a sum of average request rates $B_j$ of the all cells of the cell including the sector k.

Hereinafter, referring to FIG. 4, the sector skewness resolution algorithm is described.

In operation S610, the proportional service rate $r_k$ of sector k and the proportional request rate $b_k$ of sector k are computed with respect to each sector.

In operation S620, when the proportional service rate $r_k$ of sector k is less than or equal to the proportional request rate $b_k$ of sector k, the sector k in the cell including the sector k provides relatively less service than a service request. Specifically, a relatively fewer number of carriers than the service request are assigned to the sector k in the cell including the sector k. Accordingly, the sector skewness algorithm ends.

As a result of the determining in operation S620, when the proportional service rate $r_k$ of sector k is greater than the proportional request rate $b_k$ of sector k, an operation S630 is performed. Specifically, a relatively greater number of carriers than the service request are assigned to the sector k in the cell including the sector k.

In operation S630, a single carrier of a carrier set of the sector k is selected. According to an exemplary embodiment, the single carrier of the carrier set of the sector k is randomly selected.

In operation S640, the selected carrier is excluded from the carrier set of the sector k. Specifically, the sector k may not use the selected carrier. Accordingly, the selected carrier is assigned to another sector when performing an algorithm described with reference to FIG. 3 with respect to other sectors.

In operation S650, the proportional service rate $r_k$ of sector k and the proportional request rate $b_k$ of sector k are computed again. Also, operations S630, S640, and S650 are repeated until the proportional service rate $r_k$ of sector k is less than or equal to the proportional request rate $b_k$ of sector k.

The sector skewness resolution algorithm is for regularly controlling a service amount and a service request amount per sector during a scheduling period. When a traffic load is high with respect to an entire cell, and a data request amount of a particular sector increases, an appropriate service may not be performed in another sector since a resource allocation, i.e., a carrier assignment, is concentrated on the particular sector. In this case, according to the sector skewness resolution algorithm, each sector relinquishes the carrier in proportion to a resource request amount, and thus above-described disadvantage may be overcome.

The sector skewness resolution algorithm may be applied to the carrier assignment with respect to the base station and the relay station in the relay mode. For this, in the above-described description, an index of the sector k may be applied by including the index of the sector k in a sector as well as the relay station.

For example, $R_k$ of Equation 1 is an average service rate of a node k, i.e., the base station or the relay station, in the relay mode. Also, $R_k$ is obtained by multiplying an average service rate per carrier $\mu_k$ of node k and a number of carriers $N_k$ of node k. $B_k$ of Equation 2 is an average request rate of node k, and obtained by multiplying an average request rate per node $\lambda_k$ of node k and a number of nodes $M_k$ of node k. $r_k$ of Equation 3 is a proportional service rate of node k. $b_k$ of Equation 4 is a proportional request rate of node k. Here, m denotes a number of base station and relay station for each cell.

In operation S610, in the relay mode, the proportional service rate $r_k$ of node k and the proportional request rate $b_k$ of node k are computed with respect to each node, i.e., the base station or the relay station.

In operation S620, when the proportional service rate $r_k$ of node k is less than or equal to the proportional request rate $b_k$ of node k, the node k in a cell including the node k provides relatively less service than a service request. Specifically, a relatively fewer number of carriers than the service request are assigned to the node k in the cell including the node k. Accordingly, the sector skewness resolution algorithm ends.

As a result of the determining in operation S620, when the proportional service rate $r_k$ of node k is greater than the proportional request rate $b_k$ of node k, an operation S630 is performed. Specifically, a relatively greater number of carriers than the service request are assigned to the node k in the cell including the node k.

In operation S630, a single carrier of a carrier set of the node k is selected. According to an exemplary embodiment, the single carrier of the carrier set of the node k is randomly selected.

In operation S640, the selected carrier is excluded from the carrier set of the node k. Specifically, the node k may not use the selected carrier. Accordingly, the selected carrier is assigned to another node, i.e. the base station or the relay station, when performing an algorithm described with reference to FIG. 5 with respect to other nodes.

In operation S650, the proportional service rate $r_k$ of node k and the proportional request rate $b_k$ of node k are computed again. Also, operations S630, S640, and S650 are repeated until the proportional service rate $r_k$ of node k is less than or equal to the proportional request rate $b_k$ of node k.

Figure 7A:
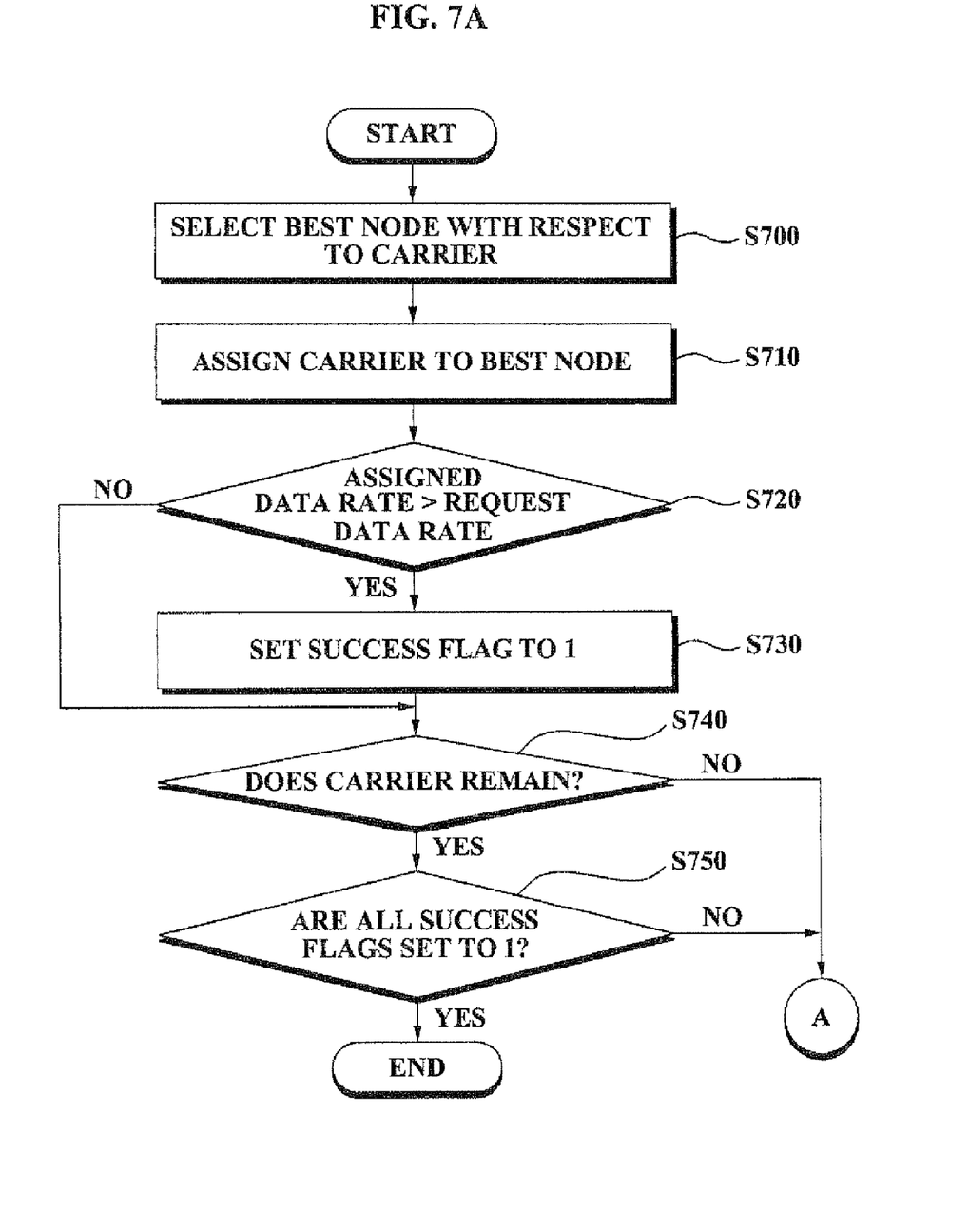
FIGS. 7A and 7B are flowcharts illustrating an adaptive resource allocation algorithm according to an exemplary embodiment of the present invention.
Figure 7B:
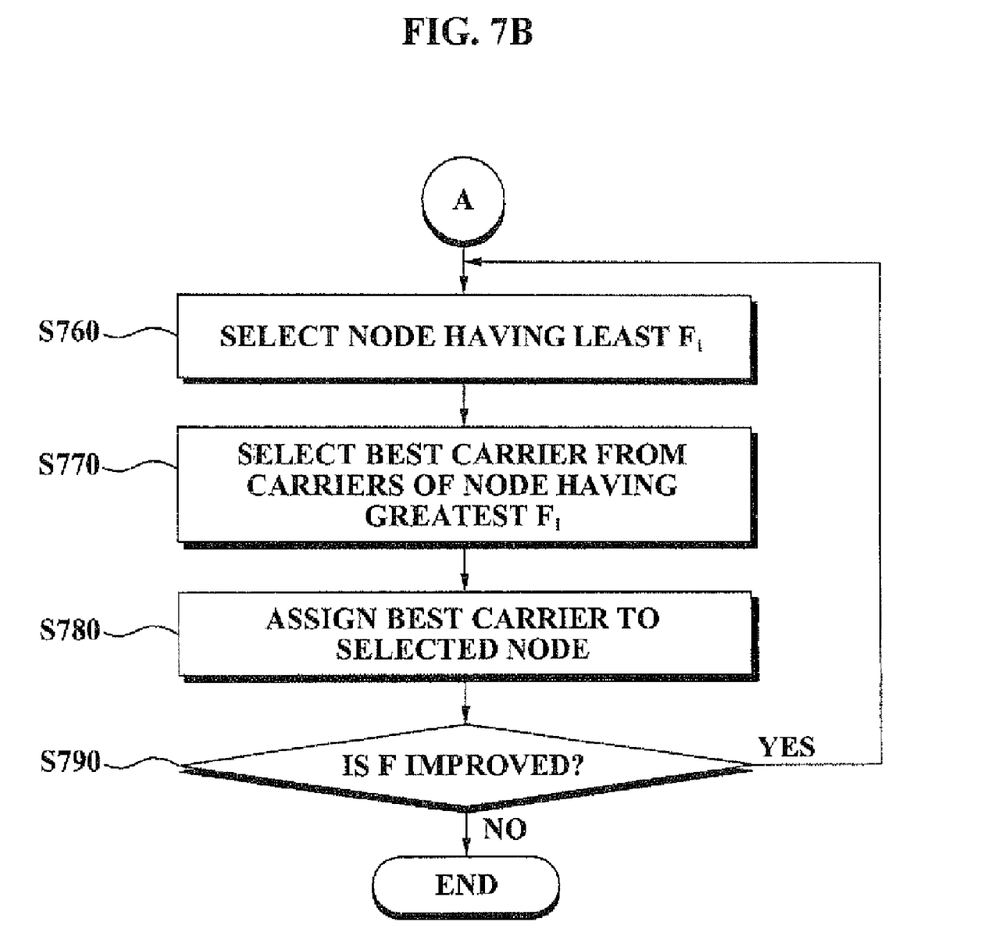

FIGS. 7A and 7B are diagrams illustrating an adaptive resource allocation algorithm according to an exemplary embodiment of the present invention. The adaptive resource allocation algorithm may be used when assigning a carrier to a link between a base station and a relay station or between the base station and a mobile station in a normal mode. The adaptive resource allocation algorithm may also be used when assigning a carrier to a link between the mobile station and the base station or between the mobile station and the relay station in a relay mode.

In operation S700, a node selects a best node with respect to a carrier. In operation S710, the node assigns the carrier to the most appropriate node.

Referring to FIG. 3, in the normal mode, the base station receives the SINR measured from the relay station and the mobile station belonging to the base station. Also, the base station assigns the most appropriate carrier with respect to each of the relay station and the mobile station, based on the SINR report received from each of the relay station and the mobile station belonging to the base station.

Referring to FIG. 1A, the base station 115 receives the SINR report from the relay stations 125 and 135 and the mobile station 117. Also, the base station 115 assigns the carrier to a node having the highest SINR, based on the SINR report. For example, assuming that a carrier set includes a carrier 1, a carrier 2, a carrier 3, a carrier 4, a carrier 5, a carrier 6, a carrier 7, a carrier 8, a carrier 9, and a carrier 10. The base station 115 of the selected sector broadcasts the signal tone on every carrier from the carrier 1 through the carrier 10. The remaining base stations excluding the base station of the selected sector broadcast the signal tone on the carrier assigned to the respective remaining base stations. Also, the relay stations 125 and 135 and the mobile station 117 belonging to the base station 115 measure the SINR of the received signal tone and reports the measured SINR to the base station 115. The base station 115 assigns the carrier to the relay stations 125 and 135 and the mobile station 117, based on the received SINR report. When the relay station 125 has a greatest SINR with respect to the carrier 1, the carrier 1 is assigned to the relay station 125 in the normal mode. When communicating with the relay station 125 in the normal mode, the base station 115 uses the carrier 1. Similarly, when the relay station 135 has a greatest SINR with respect to the carrier 2, the carrier 2 is assigned to the relay station 135. When the relay station 135 has a greatest SINR with respect to the carrier 3, the carrier 3 is assigned to the relay station 135. In this case, the base station 115 uses the carrier 2 and the carrier 3 when communicating with the relay station 135 in the normal mode.

Also, as described above, a same method as the normal mode is performed in the relay mode. Referring to FIG. 5, in the relay mode, the base station receives the SINR measured from the mobile station belonging to the base station, and the relay station receives the SINR measured from the mobile station belonging to the relay station. Also, the base station and the relay station assign the best carrier with respect to each mobile station, based on the SINR report received from each mobile station belonging to each of the relay station and the base station.

Referring to FIG. 1B, the base station 115 receives the SINR report from the mobile stations 117, 118, and 119. The base station 115 assigns the carrier to a mobile station having a greatest SINR based on the SINR report. Also, the relay station 125 receives the SINR report from the mobile station 127, and the relay station 135 receives the SINR report from the mobile stations 137 and 139. The relay station 125 assigns a carrier to a mobile station having a greatest SINR with respect to a selected carrier based on the SINR report.

However, in this case, the carrier may not be assigned to any node or an unbalance of a carrier assignment may be generated among nodes. Operations S720, S730, S740, and S750 are performed to overcome the above-described disadvantage.

In operation S720, an assigned data rate and a request data rate are compared. For example, when the carrier 2 and the carrier 3 are assigned to the relay station 135 in the normal mode, the assigned data rate is a data rate which is supported by the carrier 2 and the carrier 3. The assigned data rate and the request data rate which is required by the relay station 135 are compared.

As a result of the comparing in operation S720, if it is determined that the assigned data rate is greater than or equal to the request data rate, operation S730 is performed. In operation S730, a success flag is set to '1'. Specifically, the success flag set to '1' with respect to a corresponding node indicates that the assigned data rate with respect to the corresponding node is greater than or equal to the request data rate.

In operation S740, whether the carrier remains is determined. Specifically, whether an unassigned carrier exists from among an allocable carrier set is determined. When the carrier does not remain, a phase 2 illustrated in FIG. 7B is performed.

As a result of the determining in operation S740, if it is determined that there is a carrier remaining, operation S750 is performed. In operation S750, it is determined whether all success flags are set to 1'. When the all success flags are set to '1', necessary carriers with respect to all nodes are sufficiently assigned, and thus the adaptive resource allocation algorithm ends. As a result of the determining in operation S750, if it is determined that the all success flags are not set to '1', the phase 2 illustrated in FIG. 7B is performed.

The phase 2 is illustrated in FIG. 7B in detail. The phase 2 is performed when either 1) a carrier to be assigned to the nodes is lacking, or 2) fewer carriers than required are assigned to a portion of the nodes although the carrier has been assigned to the nodes.

To describe FIG. 7B, a fairness Fi of node i and a fairness of an entire system F are described.

$$Fi = Di/Si \qquad \text{[Equation 5]}$$

Di=amount of service data of node i

Si=amount of request data of node i

Equation 5 describes a fairness Fi of node i. Di denotes an amount of service data of node i and Si denotes an amount of request data of node i. Referring to FIG. 1A, in the normal mode, the base station 115 assigns the carrier to the relay stations 125 and 135 and the mobile station 117. In this instance, the base station 115 may compute a fairness Fi of each of the relay stations 125 and 135 and the mobile station 117 using an amount of service data Di and an amount of request data Si of each of the relay stations 125 and 135 and the mobile station 117. Similarly, in the relay mode, the base station 115 may compute a fairness Fi with respect to each of the mobile stations 117, 118, and 119. Also, the relay station 135 may compute a fairness Fi with respect to each of the mobile stations 137 and 139.

$$F = 1 - \Sigma(1-Fi)^2 \qquad \text{[Equation 6]}$$

Equation 6 describes the fairness of the entire system F. When F is '1', the carrier is perfectly fairly assigned to all nodes.

As described above, the phase 2 is performed when either 1) a carrier to be assigned to the nodes is lacking, or 2) fewer carriers than required are assigned to a portion of the nodes although the carrier has been assigned to the nodes. In this case, a carrier, which is previously assigned to the node, is reassigned to another node through operations S760, S770, S780, and S790 to improve a fairness among nodes.

In operation S760, a node having a least fairness Fi is selected. For example, in FIG. 1A, in the normal mode, after assigning the carrier with respect to the relay stations 125 and 135 and the base station 115, a fairness Fi is computed with respect to each of the relay stations 125 and 135 and the base station 115, and thus the node having the least fairness Fi is selected.

In operation S770, a best carrier is selected from carriers of a node having a greatest fairness Fi. For example, when the carrier 1, the carrier 2, and the carrier 3 are the carriers assigned to the node having the greatest fairness Fi, the most appropriate carrier is selected from the carrier 1, the carrier 2, and the carrier 3.

In operation S780, the selected best carrier is assigned to a selected node. Specifically, the best carrier from among the carriers, assigned to the node having the greatest fairness Fi, is reassigned to the node having the least fairness Fi.

In operation S790, the fairness of the entire system F is computed again, and whether the fairness of the entire system F is improved in comparison to a previous fairness of the entire system F is determined. If it is determined that the fairness of the entire system F is improved, the adaptive resource allocation algorithm returns to operation S760. When the fairness of the entire system F is not improved, the fairness of the entire system F is no longer improved by the reassignment, and thus the adaptive resource allocation algorithm ends.

The method of assigning a carrier according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, or data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to exemplary embodiments of the present invention, there is provided a method of assigning a carrier for mitigating inter-cell interference which actively adjusts for a communication environment change in a fixed relay structure and distributedly reduces inter-cell interference.

Also, according to exemplary embodiments of the present invention, there is provided a method of assigning a carrier for mitigating inter-cell interference where information of all nodes included in an entire communication system is not collected, each node distributedly performs the method of assigning a carrier according an exemplary embodiment of the present invention, and thus inter-cell interference may be reduced when a breakdown or malfunction of a portion of nodes occurs.

Also, according to exemplary embodiments of the present invention, there is provided a method of assigning a carrier for mitigating inter-cell interference which is independently performed for each sector and may solve an imbalance of an inter-sector or inter-cell service load.

Also, according to an exemplary embodiment of the present invention, there is provided a method of assigning a carrier for mitigating inter-cell interference where a resource of a relay station is determined according to a distribution algorithm in a relay mode, and an imbalance of a service load between the relay station and a base station in a cell is addressed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of assigning a carrier in a normal mode of a relay communication system, the method comprising:

defining at least one sector group by grouping cells which are at least two tiers away from each other;

selecting a single sector group from the at least one sector group; and assigning, by a base station of the selected sector group, a first carrier to a relay station or a mobile station which is located in a coverage area of the base station.

2. The method of claim 1, wherein the assigning comprises:

broadcasting, by the base station of the selected sector group, a signal tone on every carrier;

broadcasting, by remaining base stations other than the base stations of the selected sector group, a signal tone on a carrier respectively assigned to each of the remaining base stations;

receiving a measured signal-to-interference-and-noise ratio (SINR) from the relay station or the mobile station which is located in a coverage area of the base station; and assigning the first carrier to the relay station or the mobile station based on the SINR.

3. A method of assigning a carrier in a relay mode of a relay communication system, the method comprising:

selecting a node from a plurality of nodes including at least one base station and at least one relay station included in a cell;

broadcasting, by the selected node, a signal tone on every carrier;

broadcasting, by remaining nodes other than the selected node among the plurality of nodes, a signal tone on a carrier respectively assigned to the remaining nodes;

measuring a signal-to-interference-and-noise ratio (SINR) by a mobile station belonging to the selected node of the cell;

reporting the measured SINR to the selected node from the mobile station; and assigning, by the selected node to which the mobile station belongs, a carrier to the mobile station based on the SINR.

4. A method of assigning a carrier in a base station in a relay communication system, the method comprising:
   determining whether a current mode is a normal mode or a relay mode;
   determining whether a base station is included in a selected sector group; and
   assigning carriers to be used in the normal mode to a relay station or a mobile station belonging to the base station, when the current mode is the normal mode and the base station is included in the selected sector group.

5. The method of claim 4, further comprising:
   broadcasting a signal tone on a carrier assigned to the base station, when the current mode is the normal mode and the base station is excluded from the selected sector group.

6. The method of claim 5, wherein the assigning of carriers to be used in the normal mode comprises:
   broadcasting a signal tone on every carrier of a plurality of carriers;
   receiving a measured signal-to-interference-and-noise ratio (SINR) from the relay station or the mobile station belonging to the base station; and
   assigning the carriers to be used in the normal mode to the relay station or the mobile station, based on the measured SINR.

7. The method of claim 4, further comprising:
   determining whether the base station is a selected node when the current mode is the relay mode; and
   assigning a carrier to be used in the relay mode to the mobile station belonging to the base station, when the current mode is the relay mode and the base station is a selected node.

8. The method of claim 7, further comprising:
   broadcasting a signal tone on a carrier assigned to the base station when the current mode is the relay mode and the base station is excluded from the selected node.

9. The method of claim 7, wherein the assigning of the carrier to be used in the relay mode comprises:
   broadcasting the signal tone on every carrier of a plurality of carriers;
   receiving a measured signal-to-interference-and-noise ratio (SINR) from a mobile station belonging to the base station; and
   assigning a carrier to be used in the relay mode to the mobile station based on the SINR.

10. A method of assigning a carrier in a base station in a relay communication system, the method comprising:
    determining whether a current mode is a normal mode or a relay mode;
    determining whether a base station is included in a selected sector group;
    assigning carriers to be used in the normal mode to a relay station or a mobile station belonging to the base station, when the current mode is the normal mode and the base station is included in the selected sector group;
    broadcasting a signal tone on a carrier assigned to the base station, when the current mode is the normal mode and the base station is excluded from the selected sector group,
    wherein the assigning of carriers to be used in the normal mode comprises:
       broadcasting a signal tone on every carrier of a plurality of carriers;
       receiving a measured signal-to-interference-and-noise ratio (SINR) from the relay station or the mobile station belonging to the base station; and
       assigning the carriers to be used in the normal mode to the relay station or the mobile station, based on the measured SINR, and
    wherein the assigning of the carrier to be used in the normal mode comprises:
       selecting a first carrier among the plurality of carriers; and
       assigning the first carrier to a first station, being one of the relay station or the mobile station, when the first station has a greatest SINR with respect to the first carrier and requires an allocation of the first carrier.

11. The method of claim 10, further comprising:
    assigning a portion of the plurality of carriers, which are assigned to any one of a relay station and a mobile station which has a greatest amount of service data in comparison to an amount of request data, to any one of a relay station and a mobile station which has a least amount of service data in comparison to the amount of request data, until $1-\Sigma(1-Fi)^2$ satisfies a condition, where Fi=Di/Si, Di denotes an amount of service data of each of the relay station and the mobile station, and Si denotes an amount of request data of each of the relay station and the mobile station.

12. The method of claim 10, wherein the assigning of the carrier to be used in the normal mode comprises:
    computing a proportional service rate and a proportional request rate with respect to a selected sector of the selected sector group;
    if the proportional service rate is greater than the proportional request rate with respect to the selected sector;
    selecting any one of the plurality of carriers assigned to the selected sector, and
    excluding the selected carrier from a carrier set of the selected sector.

13. The method of claim 12, wherein the proportional service rate is an average service rate of the selected sector with respect to a sum of average service rates of all sectors of a cell including the selected sector, and the proportional request rate is an average request rate of the selected sector with respect to a sum of average request rates of all sectors of the cell including the selected sector.

14. A computer-readable storage medium storing a program for executing a method of assigning a carrier by a base station in a relay communication system, the method comprising:
    determining whether a current mode is a normal mode or a relay mode;
    determining whether a base station is included in a selected sector group; and
    assigning carriers to be used in the normal mode to a relay station or a mobile station belonging to the base station, when the current mode is the normal mode and the base station is included in the selected sector group.

15. The computer-readable storage medium of claim 14, further comprising:
    broadcasting a signal tone on a carrier assigned to the base station, when the current mode is the normal mode and the base station is excluded from the selected sector group.

16. The computer-readable storage medium of claim 15, wherein assigning carriers to be used in the normal mode comprises:
    broadcasting the signal tone on every carrier among a plurality of carriers;

receiving a measured signal-to-interference-and-noise ratio (SINR) from the relay station or the mobile station belonging to the base station; and assigning the carriers to be used in the normal mode to the relay station and the mobile station, based on the measured SINR.

17. The computer-readable storage medium of claim 14, further comprising:

determining whether the base station is a selected node when the current mode is the relay mode;

assigning a carrier to be used in the relay mode to the mobile station belonging to the base station, when the current mode is the relay mode and the base station is a selected node; and broadcasting a signal tone on a carrier assigned to the base station when the current mode is the relay mode and the base station is excluded from the selected node.

18. The computer-readable storage medium of claim 17, wherein assigning a carrier to be used in the relay mode comprises:

broadcasting the signal tone on every carrier among a plurality of carriers;

receiving a measured signal-to-interference-and-noise ratio (SINR) from the mobile station belonging to the base station; and assigning the carrier to be used in the relay mode to the mobile station based on the SINR.

* * * * *